United States Patent
Greene

(10) Patent No.: US 7,657,988 B2
(45) Date of Patent: Feb. 9, 2010

(54) METHOD AND APPARATUS FOR MANUFACTURING INTERCHANGEABLE AND REPLACEABLE PARTS

(75) Inventor: Michael A. Greene, Canyon, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 919 days.

(21) Appl. No.: 10/566,143

(22) PCT Filed: Feb. 20, 2004

(86) PCT No.: PCT/US2004/005080

§ 371 (c)(1),
(2), (4) Date: Jan. 27, 2006

(87) PCT Pub. No.: WO2005/084847

PCT Pub. Date: Sep. 15, 2005

(65) Prior Publication Data

US 2008/0066311 A1 Mar. 20, 2008

(51) Int. Cl.
B23Q 3/00 (2006.01)
B64C 1/00 (2006.01)

(52) U.S. Cl. .................................. 29/464; 244/117 R

(58) Field of Classification Search .................. 29/464, 29/897.2, 525.06, 243.53, 715, 430, 431, 29/791, 407.01; 244/117 R; 703/1
See application file for complete search history.

(56) References Cited

U.S. PATENT DOCUMENTS

| 5,033,014 | A | 7/1991 | Carver et al. |
| 6,003,812 | A | 12/1999 | Micale et al. |
| 6,237,210 | B1 * | 5/2001 | Stoewer et al. ................ 29/430 |
| 6,314,630 | B1 | 11/2001 | Munk et al. |
| 6,505,393 | B2 * | 1/2003 | Stoewer et al. ........... 29/525.06 |

FOREIGN PATENT DOCUMENTS

EP 1288754 A2 3/2003

OTHER PUBLICATIONS

Examination Report from the European Patent Office dated Aug. 7, 2007 for corresponding patent application EP No. 04775785.1.

* cited by examiner

Primary Examiner—John C Hong
(74) Attorney, Agent, or Firm—James E. Walton

(57) ABSTRACT

A manufacturing method and apparatus is disclosed, whereby a specific production process is used in conjunction with a specific tooling methodology to provide a tooling process package that is capable of controlling tolerance stack-ups and process variations by accounting for them at each step in the process. One application particularly suited for the present invention is in the manufacturing of panels that are assembled to form the skins of a tiltrotor aircraft (11).

9 Claims, 5 Drawing Sheets

METHOD AND APPARATUS FOR MANUFACTURING INTERCHANGEABLE AND REPLACEABLE PARTS

GOVERNMENT LICENSE RIGHTS

The U.S. Government has a paid-up license in this invention and the right in limited circumstances to require the patent owner to license others on reasonable terms as provided for by the terms of Contract No. N00019-93-C-0006 awarded by NAVAIR.

TECHNICAL FIELD

The present invention relates to the manufacturing of component parts for assembly into larger structures. In particular, the present invention relates to the manufacture of interchangeable and replaceable component panels.

DESCRIPTION OF THE PRIOR ART

Most complicated structures are assembled from a number of smaller component parts. In designing these complicated structures, it is desirable to have the component parts be replaceable and interchangeable. That way, the component parts can be quickly and easily replaced and interchanged between structures as needed during maintenance of the structures. For purposes of this application, interchangeable parts are defined as component parts that are functionally and physically equivalent to each other, so that they can be exchanged between structures, with no degradation in performance, reliability, or maintainability; and replaceable parts are defined as component parts that differ physically, in that the installation of the replaceable part requires unique operations such as drilling, reaming, cutting, etc., to make the component part fit properly onto the structure.

There are two main problems associated with manufacturing interchangeable and replaceable parts: (1) if the individual parts are not manufactured to be identical to each other, they will not properly align with the structure and other component parts, thereby preventing proper installation; and (2) if the tolerances of the individual parts are not carefully maintained, the tolerances stack up, and eventually, a part will be misaligned, thereby preventing proper installation. The latter problem is particularly prevalent in structures where multiple component parts are installed adjacent to each other, such as when the component parts are panels that form a skin over an underlying frame structure.

Often, if a component part becomes damaged or is in need or replacement, the entire structure must be taken out of use until the component part is replaced. In many instances, the replacement parts do not match the original parts closely enough, and must be either reworked to fit, or not used at all. Reworking replacement parts is an expensive and time consuming process, often resulting in component parts that do not conform to original design specifications being installed on the structure. In addition, it is practically impossible to maintain an inventory of every individual component part, if every individual component part has previously undergone unique drilling, reaming, cutting, etc., operations before being initially installed onto an the structure.

The use of interchangeable and replaceable parts is of particular importance in the aircraft industry. Aircraft travel great distances and are often many miles away from a hub or repair facility. If a component part on an aircraft, such as a panel on a wing or fuselage, becomes damaged or is in need or replacement, the aircraft must be grounded until the component part is replaced. Often, the replacement part must be shipped from great distances. This is very time consuming and costly.

This problem of stocking, shipping, and maintaining a supply of replacement parts for aircraft is particularly acute in the military. With military aircraft, it is imperative that damaged component parts be replaced quickly as possible so that aircraft downtime is minimized. For logistical purposes, only the spare parts that will be needed are shipped into the filed. For this reason, it is extremely important that every interchangeable and replaceable part fit as it is intended.

Previous methods and apparatuses to achieve interchangeability and replaceability have been unsuccessful. One such method involves the use of physical gages and a tooling family that is coordinated back to these gages to manufacture and assemble certain panels to form the exterior skin of an aircraft. In this method, the physical gages are the control media that are used to coordinate all the tools within the tooling family. This method involves fixture locating some of the panels and floating-in the remaining panels. The panels that are floated-in are best fit to obtain an optimal gap between adjacent panels. Typically, half of the engineering tolerance is allocated to the detail part, and the other half is allocated to the tooling device producing the part. Using the previously described tooling method, the physical gages are checked against the engineering drawings and the tools made from these gages are in turn checked against the gage. This results in the detail tooling matching the engineering. The parts that are made from the detail tooling are then inspected and checked against the tooling, which ultimately matches engineering, within tooling tolerances. Many of these prior-art apparatuses utilize carbon epoxy bond tools to bond the composite panels. These carbon epoxy bond molds degrade over time resulting in contours that deviated from nominal. There becomes a time when the tools have to be replaced, either with duplicate tooling, or more durable tooling, often ultimately concluding in the implementation of metallic tools. Additionally, the substructure frames of the nacelle are found to deviate from engineering nominal values due to a coefficient of thermal expansion difference between the material and the bond molds. As a result of the spring back caused by this coefficient of thermal expansion difference, the outer mold line of the structure cannot be controlled adequately. Compounding that problem is the variation in detail panel contour. The common processes and tooling methodologies for trimming thin composite panels requires the use of single rail hand router tools . However, due to the complexity of the design of most panels, and the limitations of single rail hand routers, hand routing is simply not capable of repeatedly providing trim on detail parts that meet engineering specifications.

The drawbacks to this method are significant, and include: (1) the control tools deviate from engineering nominals; (2) the detail tool families deviate from the control tools; (3) faying surfaces (structural and panels) cannot be controlled during assembly; and (4) the assembly fixtures do not fixture locate critical features.

Although there have been many improvements in manufacturing technology, considerable shortcomings remain, particularly in the area of interchangeable and replaceable component parts.

SUMMARY OF THE INVENTION

Therefore, it is an object of the present invention to provide a method and apparatus for manufacturing interchangeable and replaceable component parts.

This object is achieved by providing a method and apparatus whereby a specific production process is used in conjunction with a specific tooling methodology to provide a tooling process package that is capable of controlling tolerance stack-ups and process variation by accounting for them at each step in the process.

The present invention provides significant advantages, including: (1) the control tools are more closely coordinated with engineering nominals; (2) the detail tool families are not susceptible to deformation that result from excessive thermal cycles, and represent the control tools; (3) the faying surfaces of the substructure and the panels can be controlled during assembly; (4) critical features are fixture located during assembly; (5) numerically controlled tooling devices that can machine parts very precisely are used, thereby freeing up tolerances; and (6) implementation of assembly variation reducing and compensating measures.

Additional objectives, features, and advantages will be apparent in the written description that follows.

BRIEF DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, wherein:

DESCRIPTION OF THE PREFERRED EMBODIMENT

It will be appreciated that the present invention can be used in wide variety of manufacturing applications. One application that is particularly well suited for the present invention is the manufacturing of panels that are assembled to form the skins of aircraft, such as the wings, fuselage, and nacelles of tiltrotor aircraft. Thus, although the present invention will be described with respect to the manufacture and assembly of interchangeable and replaceable component parts for a nacelle of a tiltrotor aircraft, it should be understood that the present invention may be used in any industry and or manufacturing application in which close relative positional tolerances are required in combination with fully interchangeable and replaceable component parts.

Figure 1:
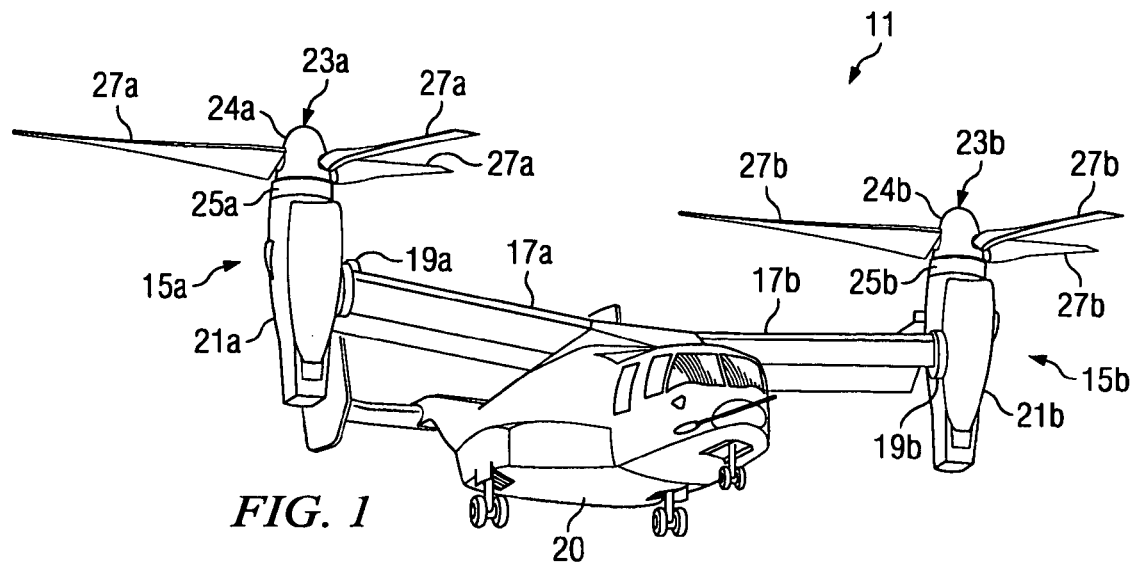
FIG. 1 is perspective view of a tiltrotor aircraft having interchangeable and replaceable component parts according to the present invention.

Referring to FIG. 1 in the drawings, a military-type tiltrotor aircraft 11 having interchangeable and replaceable component parts manufactured according to the method and apparatuses of the present invention is illustrated. Tiltrotor nacelle assemblies 15a and 15b are carried by wing members 17a and 17b, and are pivotally disposed at end portions 19a and 19b of wing members 17a and 17b, respectively. Wing members 17a and 17b are coupled to a fuselage 20. Tiltrotor nacelle assemblies 15a and 15b include nacelles 21a and 21b, which house the engines, transmissions, and proprotor gear boxes that drive proprotors 23a and 23b. Proprotors 23a and 23b are disposed on the forward ends 25a and 25b of nacelles 21a and 21b, and include hubs 24a and 24b and proprotor blades 27a and 27b, respectively. As is conventional with tiltrotor aircraft, proprotors 23a and 23b counter-rotate relative to each other, i.e., proprotor 23a rotates counterclockwise and proprotor 23b rotates clockwise if viewed looking in the aft direction while tiltrotor aircraft 11 is in the airplane mode. Tiltrotor nacelle assemblies 15a and 15b rotate relative to wing members 17a and 17b between a helicopter mode in which tiltrotor nacelle assemblies 15a and 15b are tilted upward, such that tiltrotor aircraft 11 can take off, hover, fly, and land like a conventional helicopter; and an airplane mode in which tiltrotor nacelle assemblies 15a and 15b are tilted forward, such that tiltrotor aircraft 11 flies like a conventional fixed-wing propeller driven aircraft. In FIG. 1, tiltrotor aircraft 11 is shown in the helicopter mode.

Figure 2A:
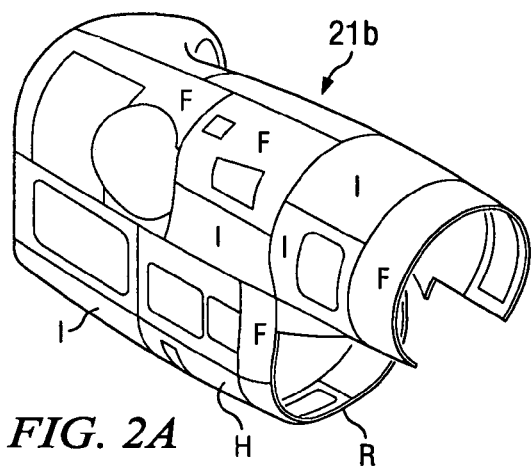
FIGS. 2A and 2B are partial perspective vies of the left side nacelle of the tiltrotor of FIG. 1.
Figure 2B:
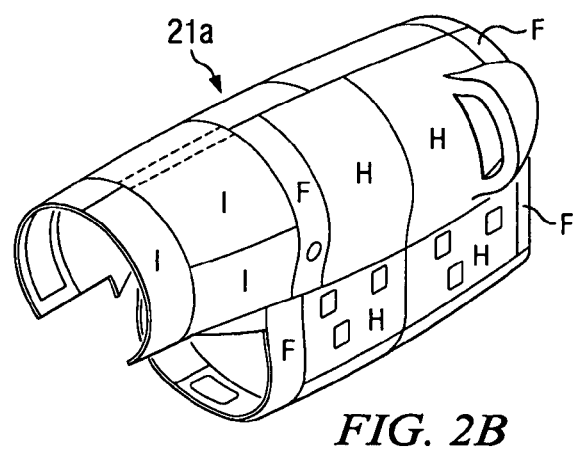

Referring now to FIGS. 2A and 2B in the drawings, two partial perspective views of left nacelle 21b are illustrated. In these views, a variety of panels that form the skin of nacelle 21b are visible. Some panels I are designed to be interchangeable; others R are designed to be only replaceable panels; some panels H are designed to be hingedly attached to the underlying frame structure; and other panels F are designed to be permanently fixed to the underlying frame structure. Many of these panels are load carrying members requiring close tolerances with specific and fasteners. The present invention provides a means by which structures, such as nacelle 21b, can be designed, manufactured, assembled, and maintained, so as to maximize usability and minimize labor, waste, maintenance time, down time, and cost.

Figure 3:
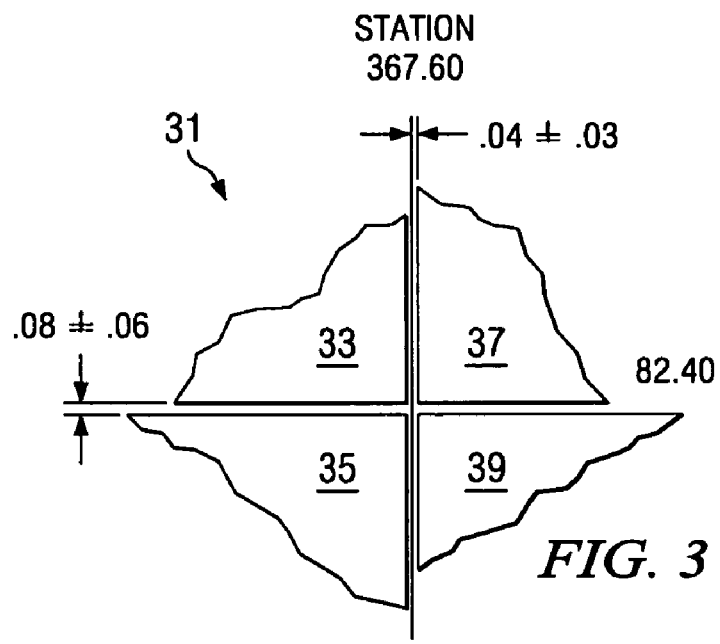
FIG. 3 is a schematic showing a typical intersection of four of the panels that form the exterior skin of the nacelle of FIGS. 2A and 2B.

Referring now to FIG. 3 in the drawings, a typical intersection 31 of four of the panels of nacelle 21b is illustrated. In this example, intersection 31 is located at station 367.60/82.40 of aircraft 11, and consists of the joining of four separate panels 33, 35, 37, and 39, in which panels 33 and 35 are fixed panels, panel 37 is an interchangeable and replaceable panel, and panel 39 is a hinged panel. Intersection 31 was designed by engineers using a computer aided design and manufacturing software. As shown in the example of FIG. 3, nacelle 21b has a nominal 0.080" gap between all panels and doors, zero rigging capabilities for hinged doors, and the Mini-Mark IV fasteners have 0.010" radial float. However, the 0.080" gap is typically split at designated stations. Such tight design tolerances are typical, and are the result of stringent aerodynamic smoothness and load carrying requirements.

The present invention is a unique combination in which a specific production process is used in conjunction with a specific tooling methodology. The process of the present invention provides a tooling process package that is capable of controlling tolerances stack and process variation by accounting for them at each step in the process. Panel interchangeability and replaceability is achieved through the combination of specific tooling and processes that are capable of compensating and adjusting for process and tooling variables with minimal operator intervention.

Figure 4:
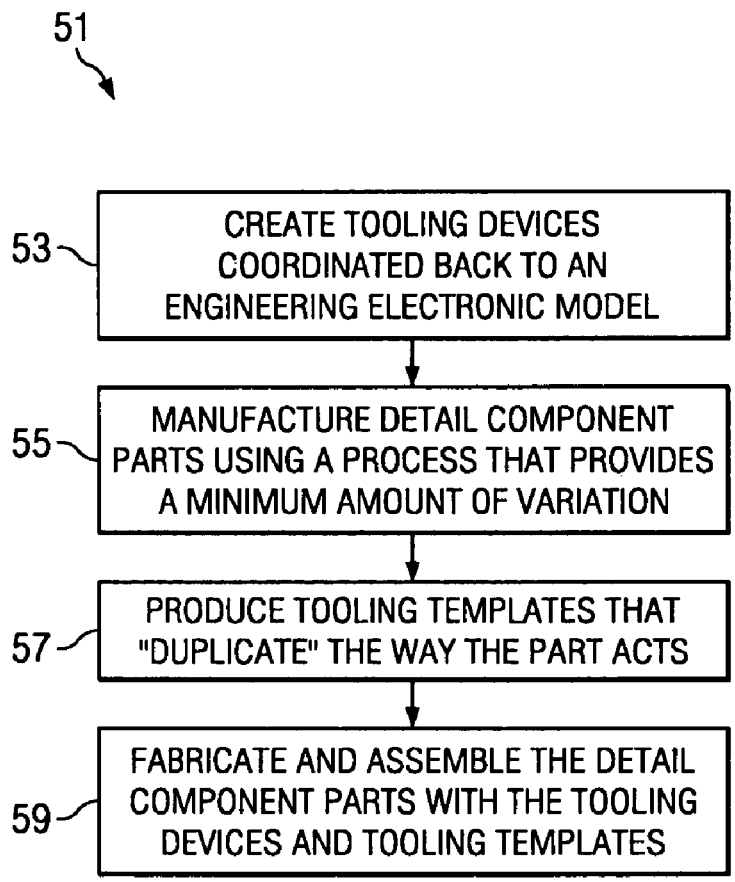
FIG. 4 is a flow chart of the manufacturing process of the present invention.
Figure 5:
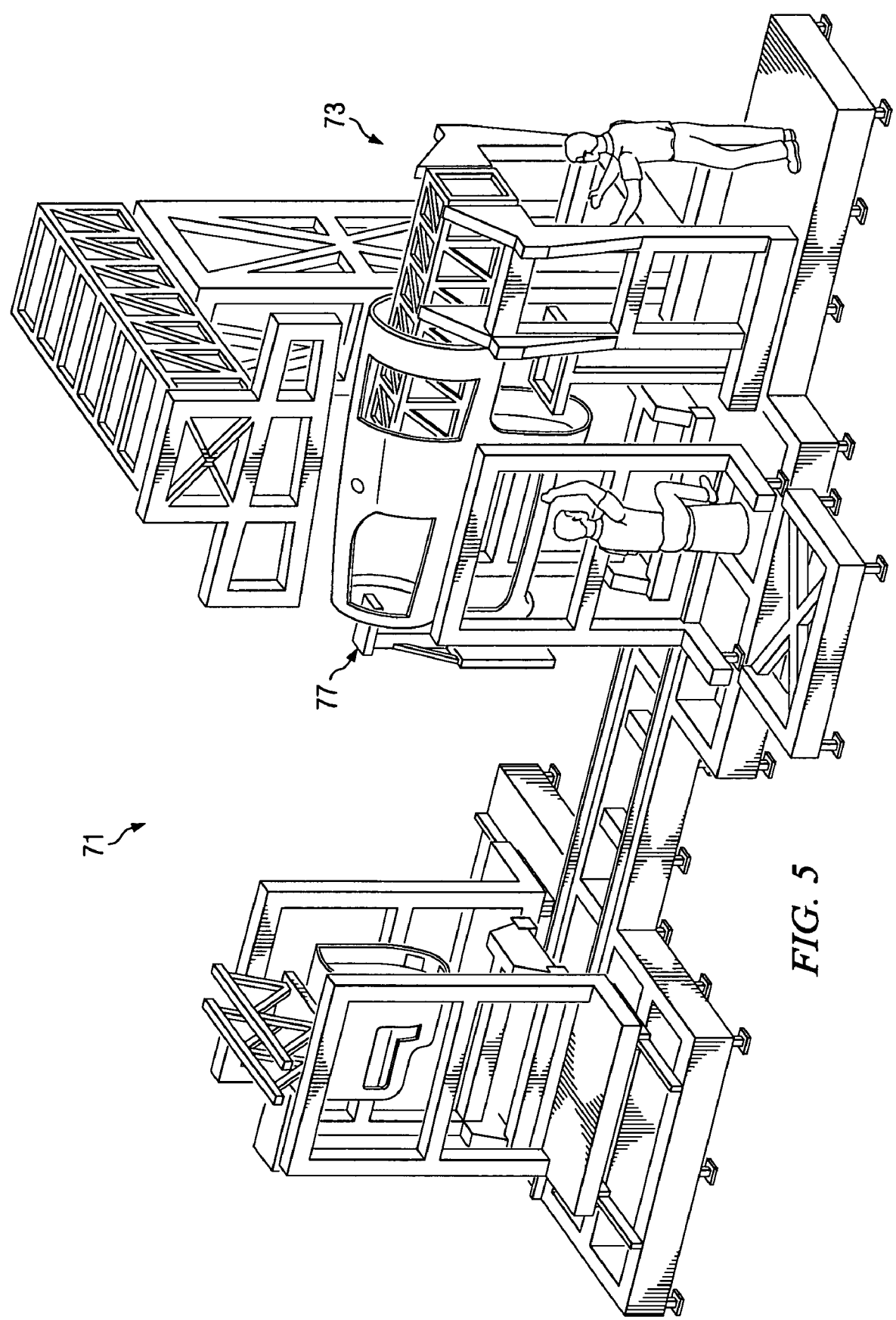
FIG. 5 is a schematic of an assembly apparatus according to the present invention.
Figure 7:
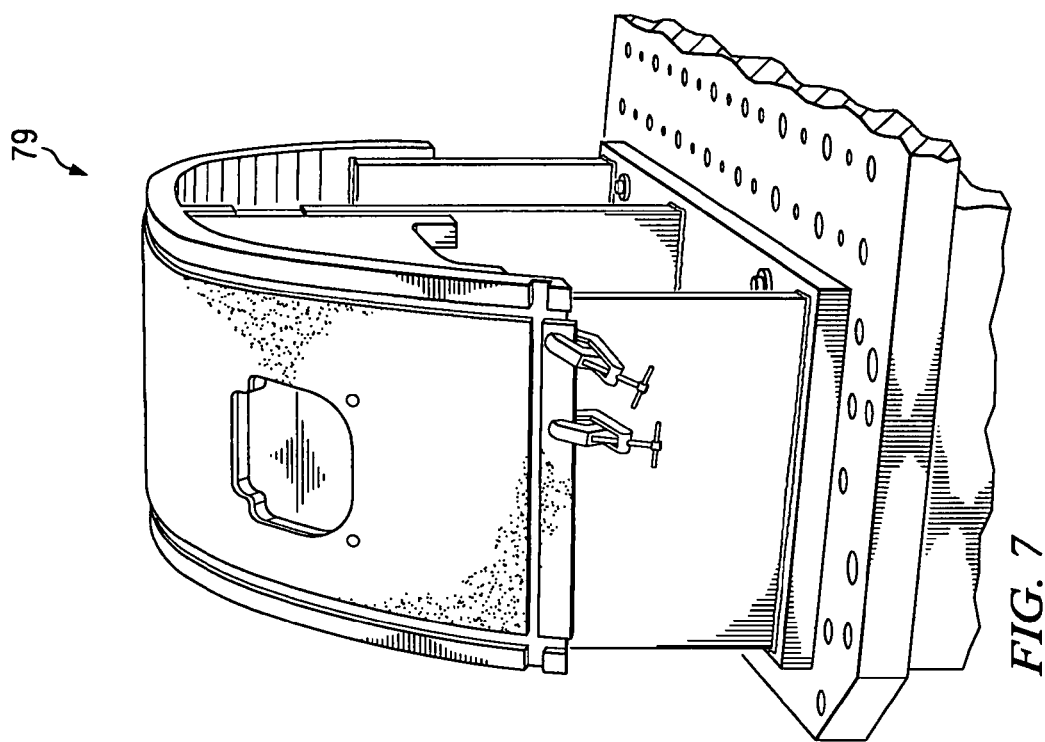
FIG. 7 is a perspective view of a machine holding fixture used in connection with the assembly apparatus of FIG. 5.
Figure 6:
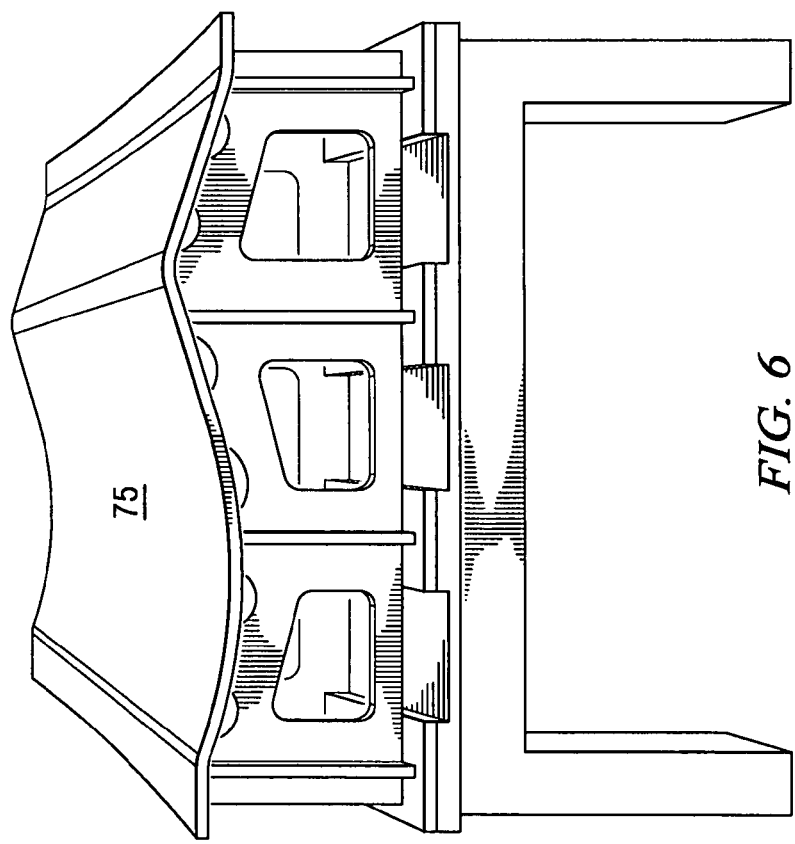
FIG. 6 is a perspective view of a bond mold used in connection with the assembly apparatus of FIG. 5.

Referring now to FIG. 4 in the drawings, a flow chart 51 representing the steps of the manufacturing process of the present invention is illustrated. The process begins at step 53 by creating tools that are not coordinated back to a physical gage, as is the current practice in the aerospace tooling industry; but rather are coordinated back to an engineering electronic model. This reduces the amount of tolerance that the tooling devices require. The next step, step 55 is the manufacturing of detail component parts using a process that provides a minimum amount of variation. This step yields detailed component parts that are as close to engineering design specifications as possible with the tooling devices available.

The process continues at step 57, which is to produce tooling templates that "duplicate" the way the part acts. This is particularly important because the template drills the holes in the structure that must match the panel. Without this matching, there can be no true interchangeable and replaceable parts. To achieve step 57, the tools are fabricated out of the actual part. By using the same production process as is used on the part, the resultant tool has "minimal" tooling tolerances. By sharing the tolerances between production and tooling, it is possible to make true interchangeable and replaceable panels that are capable of achieving stringent engineering tolerances. The process is completed at step 59, which represents the final fabrication and assembly of the detail component parts with the tooling precise devices and the tolling templates made in the form of the actual parts.

Referring now to FIGS. 5-9 in the drawings, the preferred embodiment of an assembly apparatus 71 according to the present invention is illustrated. Assembly apparatus 71 includes provisions for locating substructure components, assembly installation tools 77, and tooling details to drill installing coordinating features that will be used to locate panel templates (for drilling hole patterns for interchangeable and replaceable panels) and fixed panels. Machining center 73 allows the interchangeable and replaceable component parts to be machined to the engineering electronic model. Bond molds 75 control the outer mold line of the panel primarily to ensure a consistent surface will be common to the air stream. Machine holding fixtures 79 hold the panels to the inner mold line of the panel using a vacuum holding fixture, the rationale behind this concept is to mitigate the variation between the contour of the panel and substructure. Machining the periphery of the part and drilling the holes using the electronic model creates a new tooling family that is coordinated back to the engineering electronic model, not coordinated back to any physical gage further reducing tolerance stance. For these reasons, assembly apparatus 71 requires less engineering tolerance to assemble the nacelle and locate panels, while obtaining greater flexibility, if required, to compensate for process variable resulting in an assembly that meets engineering specifications.

Due to detail part variation and tooling methodologies used in prior-art manufacturing methods, it was not possible to accurately control the faying surfaces between the structure and the panels. This was critical toward maintain consistent gaps between adjacent panels. The present invention solves this problem by changing the manner in which the detail components are fixture located during the assembly process. For example, assembly installation tools 77 contain hole patterns that more closely represent the characteristics of the corresponding panel, and are used to locate the drill issued to drill the panel holes in the structure of the aircraft. Each individual fastener allows for 0.010 inches radial float, but because of tolerance stack the float can be "used up" after the location of the second fastener, resulting in the requirement for all other fasteners to be located nominally to ensure interchangeability and replaceability. In addition, those components of assembly apparatus 71 that might otherwise be subject to thermal expansion and contraction, are formed of material that is not subject to thermal cycles. These improvements result in consistent faying surfaces.

Figure 9:
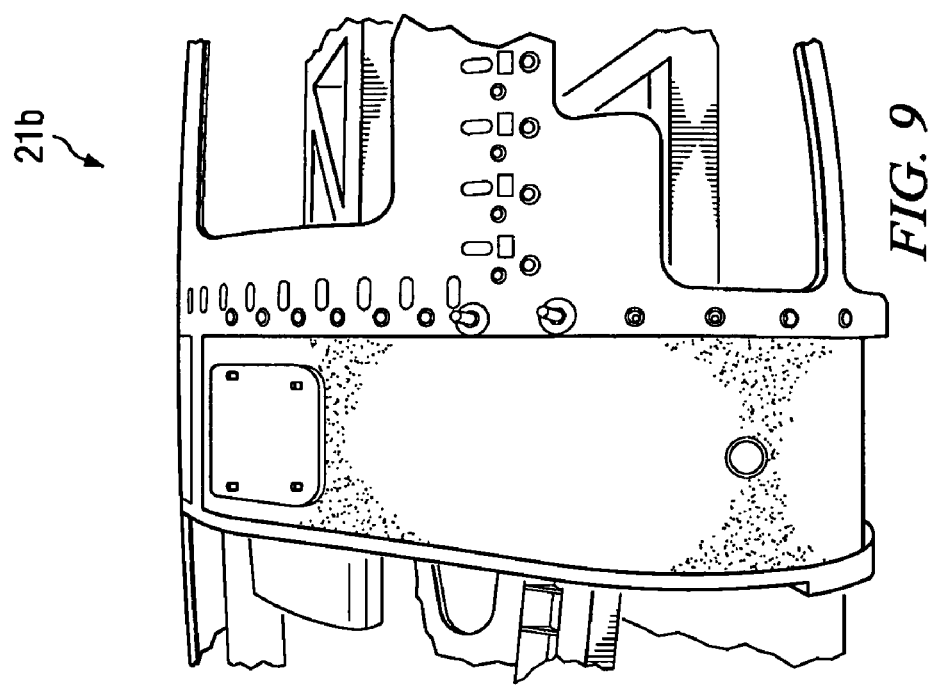
FIG. 9 is a perspective view depicting the installation of the templates and panels and the verification of the gaps associated therewith prior to drilling the holes.
Figure 8:
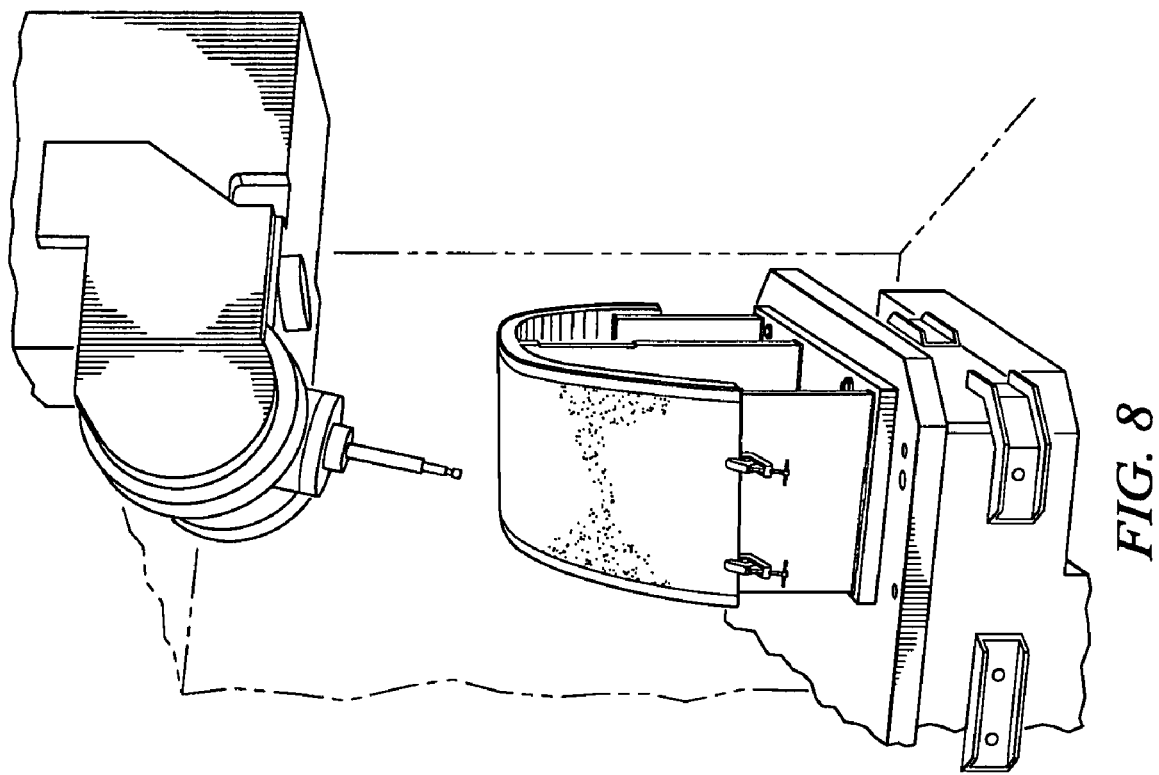
FIG. 8 is a perspective view of a machining center used in connection with the assembly apparatus of FIG. 5.

The present invention solves the problem of fixture locating some of the panels and floating in the remaining panels, by controlling the location of the panels at the assembly level. This is achieved by placing one or more locating holes in the substructure component part, and securing the tooling device to the locating hole. The locating holes are common to fastener holes in the panel, for fixed panels all remaining holes are drilled through the component part and the underlying frame structure simultaneously. For interchangeable and replaceable panels the locating process is the same, except that a tooling template is used in lieu of the panel, because the actual panel already has fastening hardware installed that would prevent back-drilling holes into the structure. This fixture locating process ensures that all holes are properly aligned, and that all machining and assembly is performed relative to the tooling device with its engineering nominals. It is well known that fixed panels and interchangeable and replaceable panels manufactured at remote facilities have pilot holes therein from which substructure holes are back-drilled, and that tooling templates be used for drilling substructure holes. This alignment verification process is depicted in FIG. 9.

Using assembly apparatus 71 of FIGS. 5-9 and the process of the present invention, a fixed panel F is installed onto nacelle 21b using the following procedure. First, a component part of the frame is supplied having two locator holes. The frame part is then secured to assembly apparatus 71 at the appropriate location with tooling pins used to secure the part to the assembly apparatus through the two locator holes. Next, a drill detail operably associated with assembly apparatus 71 drills two coordinating holes in the frame part to receive fixed panel F. The reason for not pre-drilling the coordinating holes in the frame part is to eliminate variation from remote plants. The drill detail includes drill bushings to guide the drill bit. Then, fixed panel F is secured to the frame part using tooling pins in the coordinating holes. This ensures that fixed panel F is properly located relative to the frame part and assembly apparatus 71. In the preferred embodiment, fixed panel F has all of its required holes predrilled with small pilot holes. Once fixed panel F is secured to the frame part, all of the necessary holes are drilled through the frame part and fixed panel F simultaneously.

The process for manufacturing interchangeable and replaceable panels is identical to the process set forth above, with the exception that a drill template is used in lieu of the actual interchangeable and replaceable panels.

According to the present invention, the same process that makes the production part is used to make the template for drilling the structure holes that are common to the interchangeable and replaceable part. Often, the production part is a flexible panel. These flexible templates may also be referred to as "conformal templates." Conformal templates allow the template to duplicate the compliance of the production part The foregoing process also includes a final variation compensating measure. This final variation compensating measure occurs after the coordinating holes have been drilled and the respective fixed panels and interchangeable and replaceable templates have been located to the structure, and prior to any additional panel fastener holes being drilled. In the preferred embodiment, as a final error mitigation step, all component parts are located to the substructure together with undersized pins. This allows for maximum movement and adjustment, if required. In this process for example, a frame part is permanently installed. Then, an undersized pin is placed into an undersized hole in the frame part. Next, two templates for adjacent panels are positioned over the frame part. The undersized pin passes through a regular sized hole in the first template. If the first template does not match up with the second template, the first template is moved over until it either it is in the proper location to achieve a nominal the gap, or contacts the pin. Once the two templates are properly positioned, the pin is removed and a drill bit is passed through the regular sized hole in the template and a regular sized hole is drilled through the frame part. This drilling bores out the undersized hole in the frame part. This process is repeated as necessary. Then, final assembly, related to the panel installation is performed.

This method and apparatus of the present invention takes advantage of new tool manufacturing technology that allows tools to be coordinated closer to engineering values, while requiring less of the engineering tolerance. This allows more tolerances to be used during the assembly process. Additionally, the variation and stack-up of tolerances are mitigated throughout the process with the use of innovative tooling that compensates for such factors. These processes and tooling methodologies are only an effective solution when used in conjunction with each other.

It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A method of manufacturing a structure having interchangeable component parts comprising the steps of:
   providing a precise numerically controlled assembly and machining tool;
   providing a plurality of frame components;
   fixture locating all of the frame components on the assembly and machining tool;
   providing a plurality of detail parts;
   fixture locating all of the detail parts on the assembly and machining tool;
   operably associating at least one detail template with the assembly and machining tool; and
   simultaneously machining the frame components and the detail parts with the detail template, so as to produce detail parts that are interchangeable from one structure to another.

2. The method according to claim 1, wherein the step of fixture locating all of the frame components on the assembly and machining tool is achieved by pre-drilling at least two locator holes in the frame component that are aligned with corresponding locator holes in the assembly and machining tool.

3. The method according to claim 1, wherein the step of fixture locating all of the detail parts on the assembly and machining tool comprises the steps of:
   drilling at least two coordinating holes in the frame component;
   pre-drilling at least two coordinating holes in the detail part that are aligned with the coordinating holes in the frame component; and
   attaching the detail part to the frame component at the coordinating holes.

4. The method according to claim 1, further comprising the steps of:
   pre-drilling small pilot holes in the detail parts; and
   drilling attachment holes through the pilot holes after the detail parts have been fixture located on the frame components.

5. The method according to claim 1, further comprising the steps of:
   providing undersized holes in the frame components;
   positioning adjacent detail templates over the frame components;
   providing attachment holes in the templates, the attachment holes being larger than the undersized holes;
   fitting the frame components and the detail parts together with undersized pins that pass through the attachment holes and the undersized holes;
   adjusting the fit of the detail templates by moving one detail template relative to another detail template, the movement being restricted by the undersized pins;
   removing the undersized pins;
   drilling through the attachment holes and the undersized holes with a drill bit having the same diameter as the attachment holes, so as to bore out the undersized holes;
   replacing the detail templates with the detail parts; and
   fastening the detail parts to the frame components.

6. The method according to claim 1, wherein the detail parts are interchangeable panels that form the exterior skin of an aircraft.

7. The method according to claim 1, wherein the detail parts are replaceable panels that form the exterior skin of an aircraft.

8. The method according to claim 1, wherein the detail parts are hinged panels that form the exterior skin of an aircraft.

9. The method according to claim 1, wherein the detail parts are fixed panels that form the exterior skin of an aircraft.

* * * * *